United States Patent [19]

Beuermann

[11] Patent Number: 5,074,335

[45] Date of Patent: Dec. 24, 1991

[54] DIRECTIONAL CONTROL VALVE HAVING A PLURALITY FO SWITCHING POSITIONS

[75] Inventor: Herbert Beuermann, Winterscheid, Fed. Rep. of Germany

[73] Assignee: Mannesmann Rexroth GmbH, Lohr, Fed. Rep. of Germany

[21] Appl. No.: 562,566

[22] Filed: Aug. 3, 1990

[30] Foreign Application Priority Data

Aug. 3, 1989 [DE] Fed. Rep. of Germany ....... 3925771

[51] Int. Cl.[5] ............................................ F15B 13/01
[52] U.S. Cl. .................................. 137/625.69; 91/464; 251/113
[58] Field of Search .................... 91/464; 137/625.69; 251/68, 113

[56] References Cited

U.S. PATENT DOCUMENTS

| 959,022 | 5/1910 | Luna | 251/68 X |
|---|---|---|---|
| 2,723,681 | 11/1955 | MacGlashan | 137/625.69 X |
| 3,011,519 | 12/1961 | Brinkel | 137/624.27 |
| 3,215,163 | 11/1963 | Henderson | 137/625.66 |
| 3,457,951 | 7/1969 | Williams . | |
| 3,667,501 | 6/1972 | Snoy et al. . | |
| 3,677,281 | 7/1972 | Tennis | 137/270 |
| 3,823,739 | 7/1974 | McMullan | 251/73 X |
| 4,793,378 | 12/1988 | Loeffler et al. | 137/625.66 |

FOREIGN PATENT DOCUMENTS

| 1240354 | 5/1967 | Fed. Rep. of Germany . |
| 1962069 | 6/1971 | Fed. Rep. of Germany . |
| 2213244 | 9/1973 | Fed. Rep. of Germany . |
| 2233636 | 1/1974 | Fed. Rep. of Germany . |
| 3222435 | 4/1984 | Fed. Rep. of Germany . |

Primary Examiner—Gerald A. Michalsky
Attorney, Agent, or Firm—Cushman, Darby & Cushman

[57] ABSTRACT

A directional control valve is provided which can be switched into one of its switching positions only after the operator has supplied an additional signal.

10 Claims, 7 Drawing Sheets

DIRECTIONAL CONTROL VALVE HAVING A PLURALITY FO SWITCHING POSITIONS

TECHNICAL FIELD

This invention relates to a directional control valve having a plurality of switching positions. The invention relates particularly to a directional control valve having four switching positions. More particularly, the invention relates to a directional spool valve having a linear spool (control spool). Even more particularly, the invention relates to a directional spool valve having four switching positions and a spring centered control spool. One of said switching positions, for instance the fourth also called coded switching position, has assigned to it a mechanical latching or locking arrangement. A control valve of the latter type can be of particular use in connection with switching problems using a neutral channel for actuating hydraulic apparatus.

BACKGROUND ART

A valve having four switching positions and a mechanical locking arrangement using two balls is already known. If the user switches such a valve into the fourth switching position he will notice when actuating the control spool by means of a hand lever, that an increased actuating force is necessary to reach said fourth position. In this manner, the user is informed about the switching position. Another directional control valve is known wherein the fourth switching position can be maintained or fixed by means of a holding magnet. For said known directional control valves, particularly those with four switching positions, typically the fourth switching position, provides for the so-called floating position. With said known directional control valves there exists a disadvantage if said fourth switching position can be reached unknowingly or inadvertently. Such a situation can endanger people who are in the environment of an apparatus which is actuated by such a directional control valve.

Additional prior art is disclosed in the following German patent publications: 32 22 435, 12 40 354, 22 33 636, 21 64 728, 19 62 069, 17 50 510, and 22 13 244.

It is an object of the present invention to overcome the disadvantages of the prior art. It is a particular object of the present invention to provide a directional control valve, in particular a control valve having four switching positions such that it is made clear to the operator of the valve that a special coded position, e.g. said fourth switching position is being reached. It is another object of the present invention to provide an arrangement for avoiding the inadvertent switching of the valve into this special switching position in a relatively simple and inexpensive manner.

In accordance with the invention a directional control valve is provided having a control spool. A locking arrangement serves, to latch or lock the control spool in one of its switching positions, so that another switching position, the so called special switching position can only be reached if said locking arrangement is actuated by an additional signal which will release said control spool. Preferably, said additional signal is an electrical signal. It is further preferred to apply said signal only for a short period of time so as to allow the movement of the control spool of the valve from the initially locked or latched position into a position adjacent to said latched or locked position. Preferably the control spool of the directional control valve is spring centered.

Additional preferred embodiments of the invention may be gathered from the dependent claims.

BRIEF DESCRIPTION OF THE DRAWINGS

Referring now to FIGS. 1 - 9 a first embodiment of a directional control valve 10 will be described.

The directional control valve 10, preferrably a directional linear spool valve, comprises four switching positions; a first position "0", a second position "1", a third position "2", and a fourth position "3". (Please see reference numerals 0, 1, 2, and 3 in FIGS. 1 and 2.) The directional control valve 10 is shown in FIG. 1 in its first switching position the so-called zero position. In the zero position — see also FIG. 12 — the user ports A and B as well as the tank port T are blocked. Moreover, the pump port P is blocked, which is connected via a check valve 22 to a parallel channel 71 (see FIG. 12). The so-called neutral channel 70 is, however, open. The significance of the neutral channel 70 is well known, but reference is made to the Mannesmann-Rexroth prospectus RD 64122/85. In the second switching position, referred to by "1" in FIG. 1 and 2, the user port A is connected with the tank T and the user port B is connected with the pump via valve 22 and the parallel channel 71 shown in FIG. 12.

In the third switching position referred to by "2" the user port B is connected with the tank port T and the user port A is connected with the pump P via the valve 22 and the parallel channel 71. The neutral channel 70 is blocked as was also true for the second switching position.

Figure 12:
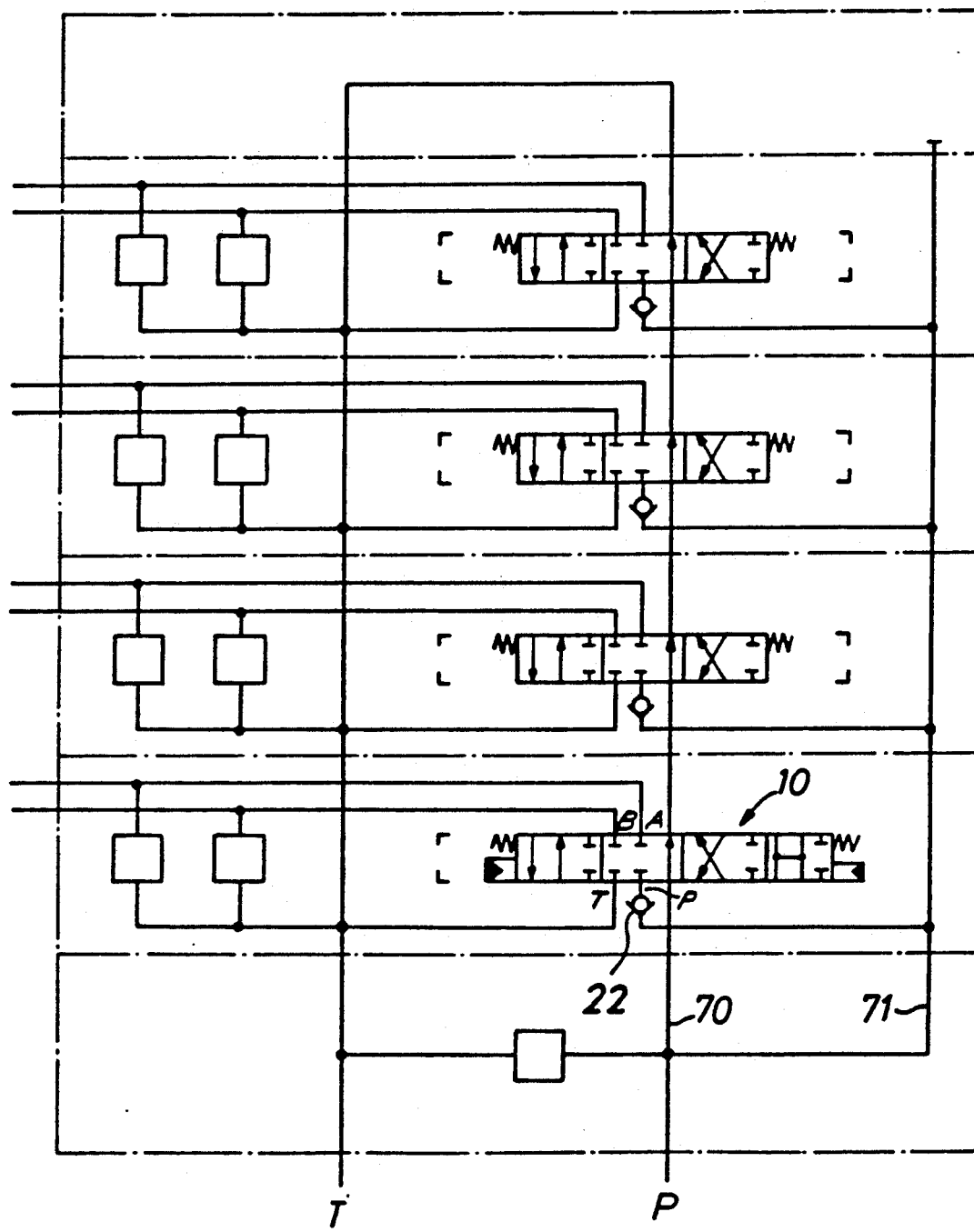
FIG. 12 is a circuit diagram of a preferred application of a directional control valve of the invention having four switching positons.

The fourth switching position, referred to by "3" provides, in case of the application shown in FIG. 12, the so-called floating position, i.e. the user ports A and B are connected to the tank and to the pump port P which is connected to valve 22. At the same time there is a connection to the neutral channel 70. Said fourth switching position "3" can, in accordance with the invention", be reached only under certain conditions, as will be explained below when describing the design of the valve 10 in some detail.

Figures 1, 2:
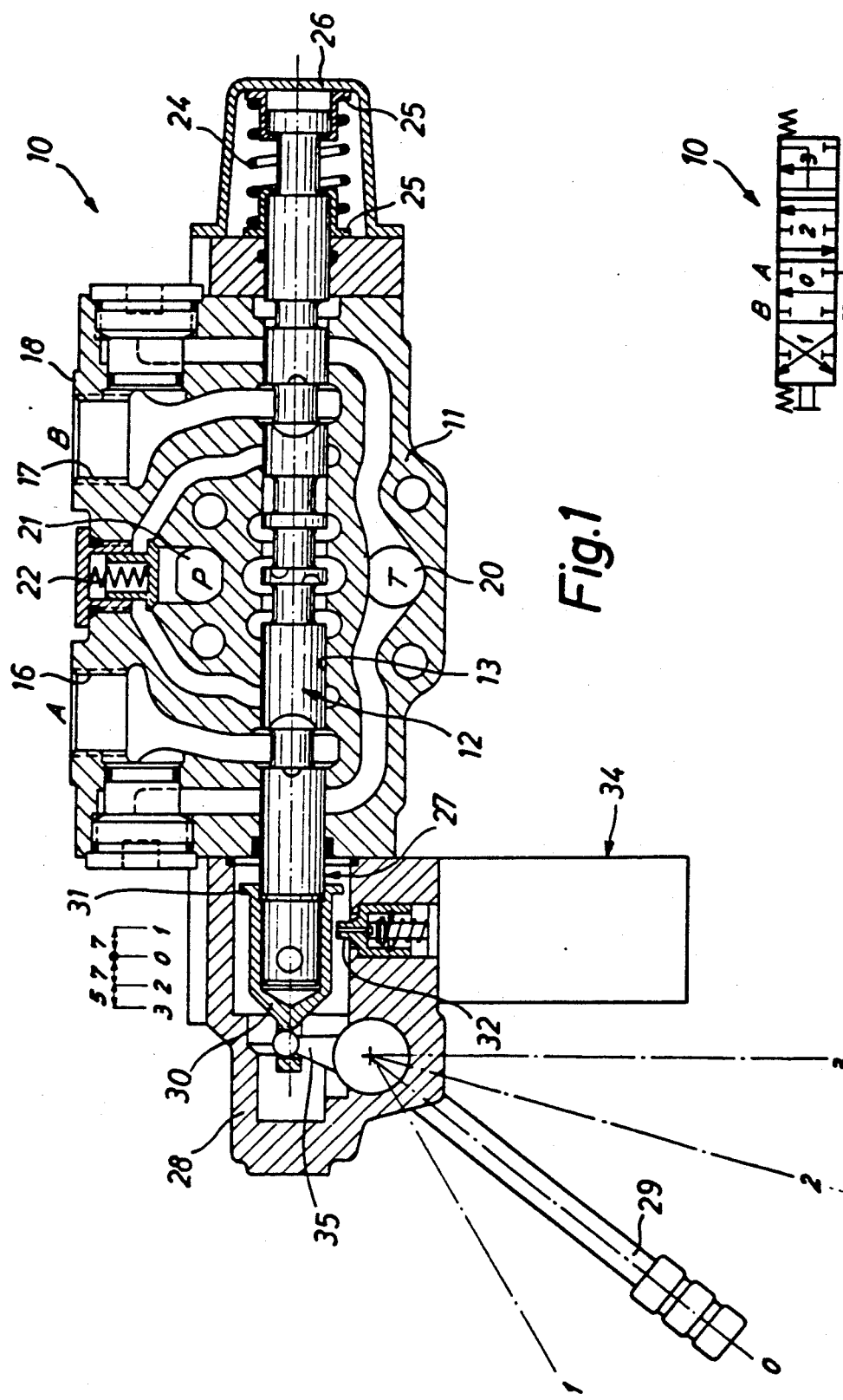
FIG. 1 is a longitudinal section of a spring centered directional control valve of the invention having four switching positions.
FIG. 2 is a switching symbol of the valve of FIG. 1.
Figure 3:
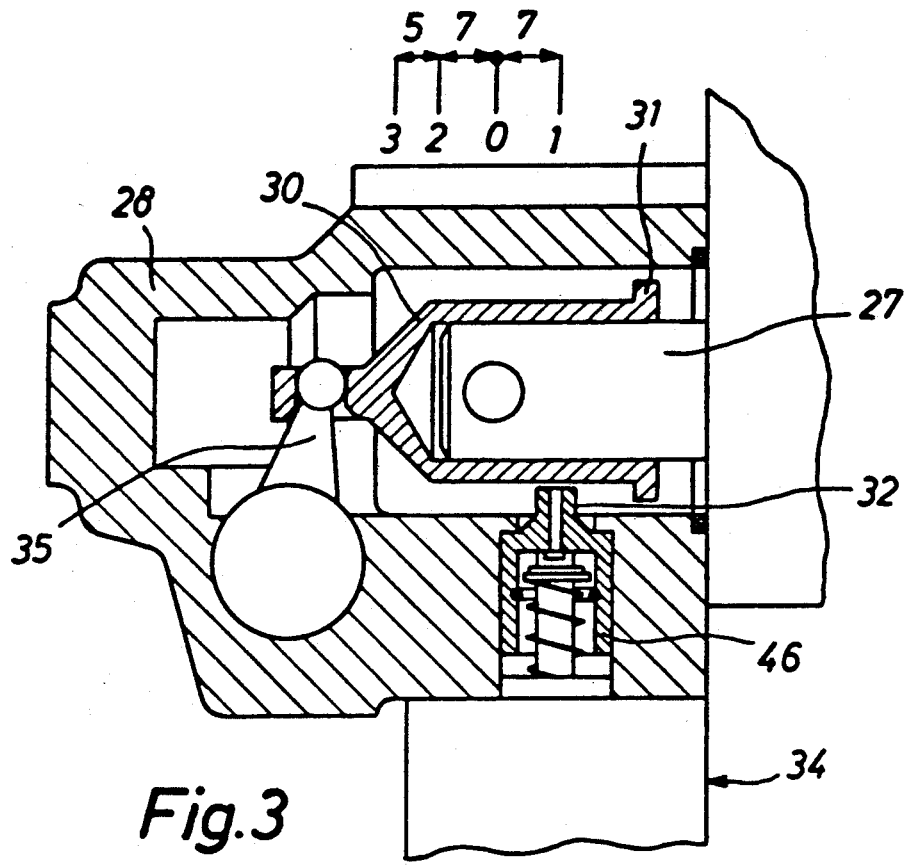
FIGS. 3 - 6 are details of FIG. 1 showing the four different switching positions of the valve of FIG. 1.

As is shown in FIG. 1, the control valve 10 comprises a valve housing 10 having a longitudinal bore 13. A valve or control spool 12 is reciprocally mounted in said longitudinal bore 13. Said valve housing 11 comprises a connecting surface 18 at which user connecting channels 16 and 17 terminate. The user channel 16 ends in the user port A, and the user channel 17 ends in user port B. The housing 11 is further provided with a tank connection 20 and a pump connection 21 which are—via appropriate channels—in connection with the longitudinal bore 13. Moreover, the check-valve 22, known per se, is located in said housing 11.

The control spool 12 is shown in FIG. 1 in its zero-position, and is held in this position by means of a centering spring 24 which acts between two spring supports 25. The centering spring 24 is enclosed by a cover 26.

The control spool 12 comprises in accordance with the invention a spool extension 27 which extends out of the valve housing 11. The spool extension 27 is surrounded by a cover or switching housing 28. The switching housing 28 is fixedly mounted to the valve housing 11. Within said switching housing 28 a manually actuable lever 29 is pivotally mounted. The lever 29 is in engagement with a latch cooperation means (locking element) 30 via a lever extension 35 such, that the control spool 12 can be moved into its different switching positions which are shown in detail in FIGS. 3 - 6. The locking element 30 has preferably the form of a sleeve 30. The sleeve 30 is mounted to the spool extension 27 by mounting means, for instance an interference pin. To provide the locking element 30 in the form of a sleeve 30 makes it possible to use a standard customary control spool 12. The sleeve 30 forms at its one end a coupling portion for cooperation with the lever extension 35, and it forms at its other end an abutment collar or shoulder 31.

Figure 5:
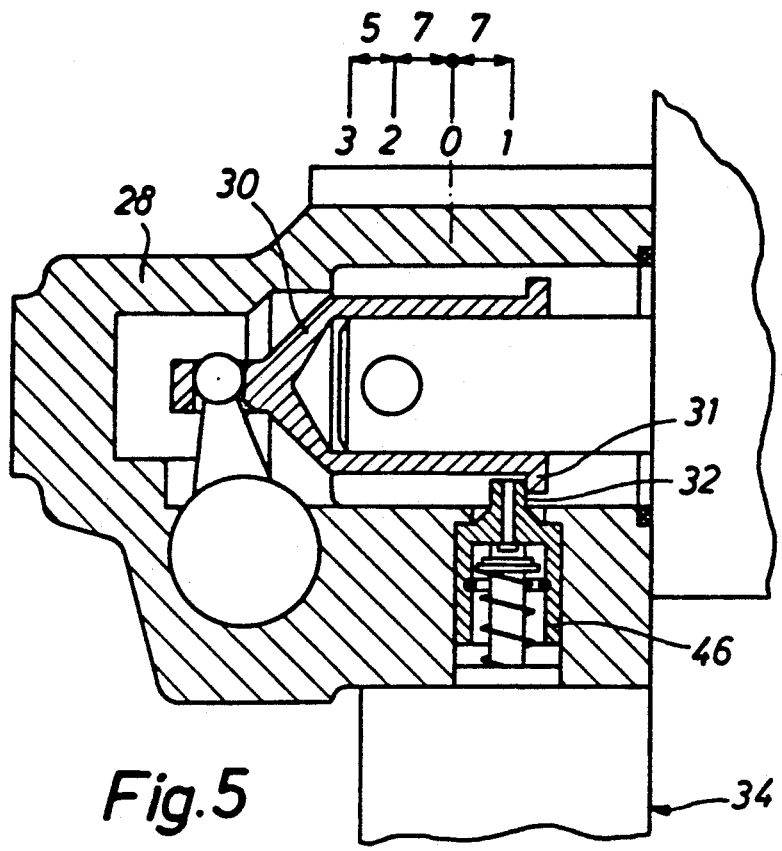
Figure 6:
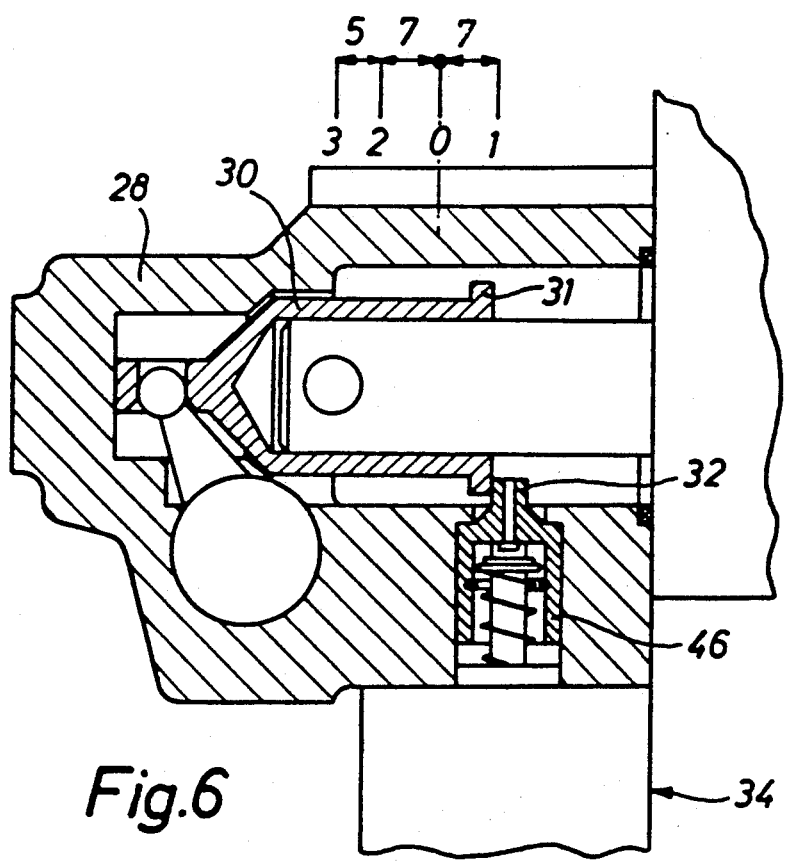
Figure 8:
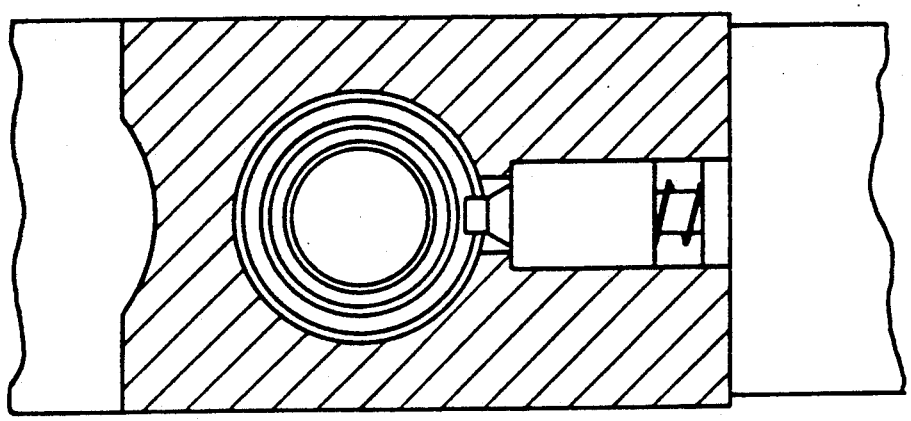
FIGS. 7 and 8 show schematically a longitudinal section and a view from the direction of arrow 8 in FIG. 7, respectively, details of the locking arrangement used for a valve shown in FIG. 1.
Figure 7:
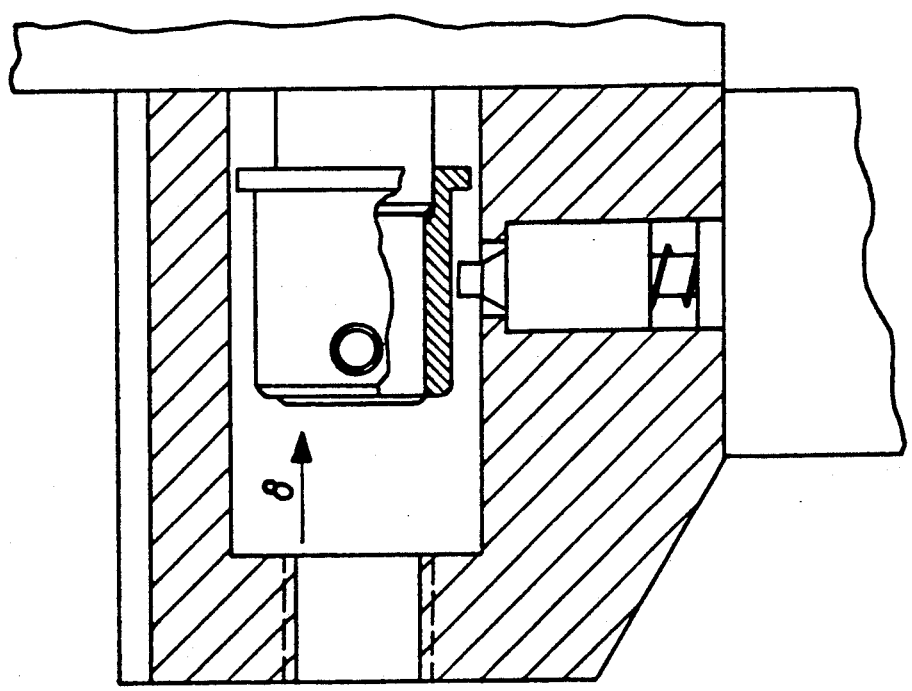
Figure 9:
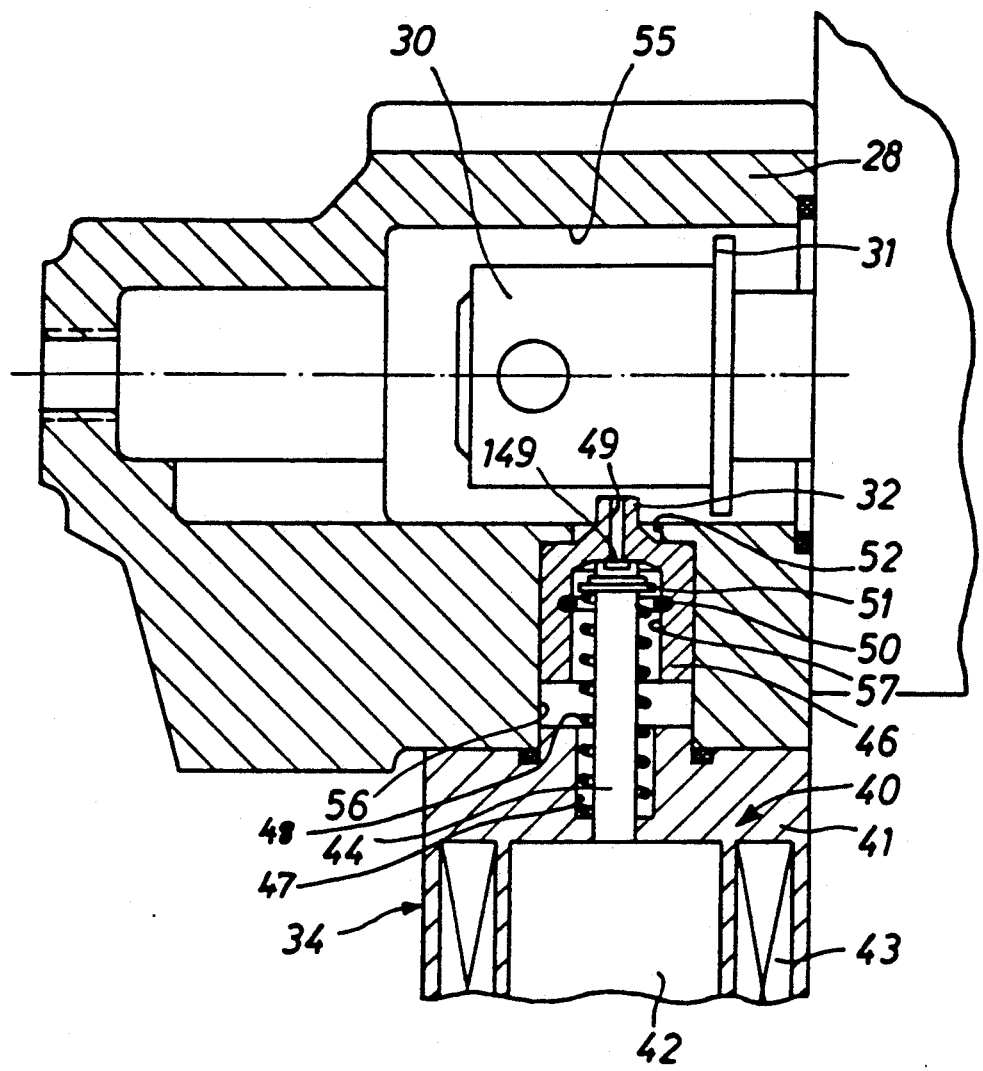
FIG. 9 is an enlarged schematic representation of the locking arrangement of FIG. 1.

In accordance with the present invention latching or securing means 34 are provided which will secure or lock the control spool 12 in one of its switching positions, for instance the third switching position "2" such that the fourth switching position (also referred to as special or coded position) which is shown in FIG. 6 and referred to by "3" can only be reached if said latching means 34 releases the control spool 12 for movement towards said fourth switching position. The latching means 34 is preferably adapted to cooperate with said locking element 30, and both together form a locking arrangement. In accordance with the invention the latching means 34 require activation by the user by means of an additional signal, before the transitional movement from the third switching position of FIG. 5 into the fourth switching position of FIG. 6 is possible. In accordance with a preferred embodiment of the invention an electric signal is selected for activating the latching means 34. It is also conceivable to use instead of an electrical signal a hydraulic signal or a mechanical signal.

Below, the latching means 34 will be described, which allow the locking as well as the un-locking of the control spool 12.

FIGS. 5 - 9 show the latching means 34 as comprising an electro-mechanical transducer, e.g. a solenoid 40 having a housing 41 by means of which the solenoid 40 is mounted to the cover 28. The solenoid 40 comprises an armature 42 (see FIG. 9) which is surrounded by a coil 43. Fixedly mounted to the armature 42 is a solenoid pin 44 which extends into a bore 56 of the housing 28. A latching element 46 is reciprocally mounted in said bore 56. The latching element 46 has a tapered end in the form of a latching bolt 32. Said latching bolt 32 extends through a bore 52 in the housing 28 and into a longitudinal bore 55 of said housing 28 so as to be adapted to cooperate with the collar 31 of the sleeve 30. This will be explained in some detail below.

The latching element 46 comprises at its one side a bore 57 into which said pin 44 extends. An abutment disc 51 is fixedly mounted to pin 44 for cooperation with an abutment ring 50 which is fixedly mounted in the latching element 46. A longitudinal bore 49 connects the bore 57 with the bore 55 so as to provide for a pressure balance. Also, at the free end of the pin 44 a groove 149 is provided to complete said connection. A coil spring 48 extends between an abutment surface formed by a recess 47 and the bottom side of the abutment disc 51, so as to bias the latching bolt 32 into its normal biased position shown in FIG. 9, in case the solenoid 40 is not energized. In this position, which can also be called the locking or latching position, a switching or moving of the control spool 12 towards the "zero position" is not possible, as can be seen in FIG. 5, but a switching into the fourth position "3" shown in FIG. 6 is possible.

The switching from the third position "2" of FIG. 5 into the fourth position "3" of FIG. 6 is only possible if the user energizes the solenoid 40 for a short period of time so that the latching element 46 is drawn from its latching position downwardly (in FIG. 9) into a release position and releases the abutment collar 31 so that a movement of the control spool 12 into the switching position of FIG. 6 is possible.

After the solenoid 40 has been energized for a short period of time the latching bolt 32 will return to its position shown in FIG. 6 due to the action of the spring 48, and, consequently, an inadvertent switching of the control spool 12 from the position shown in FIG. 6 into the position shown in FIG. 5 is impossible. Only if again a control signal is applied for a short period of time to the solenoid, such a switching from the position of FIG. 6 into the position of FIG. 5 can occur.

The use of a sleeve 30 as a latch cooperation means allows an adaptation to the respective stroke of any particular spool; in praxis, a standard control spool may be used onto which the sleeve 30 is located and is then fixedly mounted for instance by means of an interference pin.

Even though the present invention was described above in connection with a control valve 10 having four switching positions, it should be noted that the basic concept of the invention i.e. to allow the attainment of a special position, which can also be called a coded position, only if an additional electrical signal is supplied, can also be used for other control valves. Moreover, it should be noted that the electrical signal is applied only for a short time, so that after reading the coded or special position the latching bolt 32 will make it impossible that the coded or special position can be left.

With regard to the numbers "5, 7, 7," which are shown in some Figures (e.g. FIG. 1) above the reference numerals relating to the switching positions, it should be noted that they relate to the length of stroke in millimeters for a concrete design of the control valve 10. Starting from the zero-position (in both directions) each 7 mm strokes are provided, and for going from the third switching position of (FIG. 5) to the fourth switching position (of FIG. 6) 5 mm strokes are present.

As may be recognized from FIGS. 5 and 6 the abutment collar 31 defines two abutment surfaces, an abutment surface facing towards the latching bolt 32, and an abutment surface facing away from the latching bolt 32.

Figure 4:
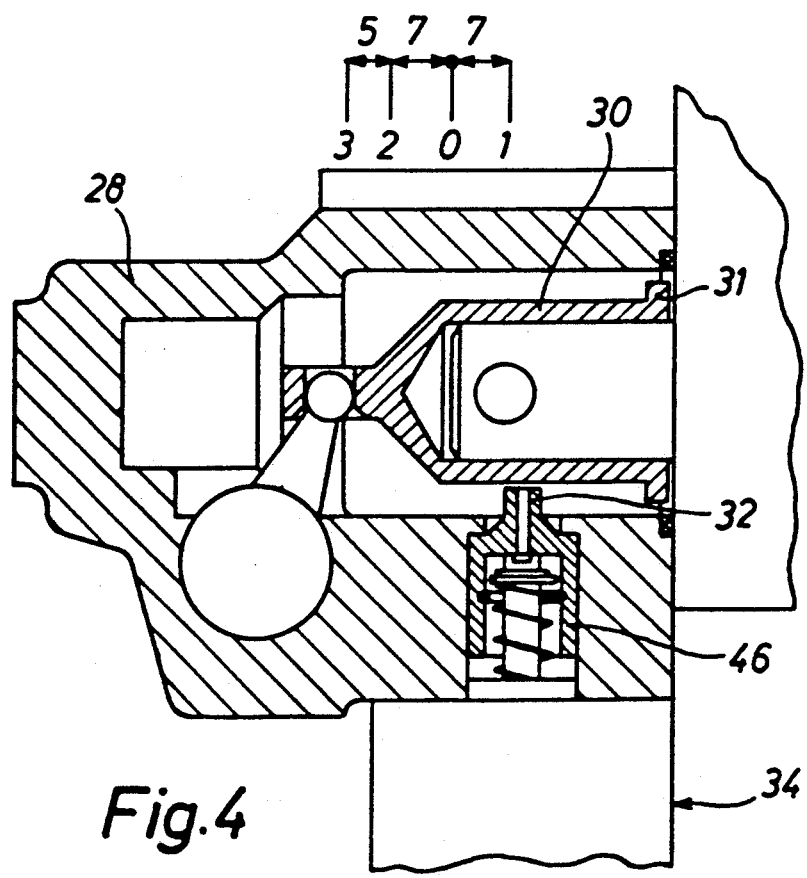

The second switching position "2" (FIG. 5) is limited by the abutment surface of the abutment collar 31 facing towards the locking bolt 32, and the fourth switching position "3" (see FIG. 6) is limited by the abutment surface facing away from the locking bolt 32 after removing and returning said locking bolt 32. As is shown in FIG. 4 the switching position "1" is limited by an abutment of the sleeve 30 at an abutment surface formed by the housing 11.

The spring-loaded locking bolt 32 is guided in the cover or housing 28 of the valve housing 11 and is held by the spring loaded magnet pin 44 in its locking position shown in FIGS. 1 - 9, and is moved into its release position as soon as the solenoid 40 is energized. Preferably, the magnet pin 44 is held in its release position by a timing member associated with the magnet 40 only for such a period of time until the control spool 12 has reached the fourth switching position.

Thereafter, the locking bolt 32 returns into the locking position shown in FIGS. 1 - 9. It can be recognized that the securing means 34 and the latching means or element 30 include cooperating means 31, 32 which are located at the head end (actuating side) of the control spool 12. The latching means comprises in accordance with the invention the sleeve 30 mounted to the control spool 13. The sleeve 30 carries the abutment collar 31. Further, the spring loaded locking bolt 32 is adapted to be actuated perpendicularly with respect to the longitudinal axis of the control spool 12.

Latching means 30,31 are adapted for cooperation with locking means 34 and form together the locking arrangement.

Figure 10:
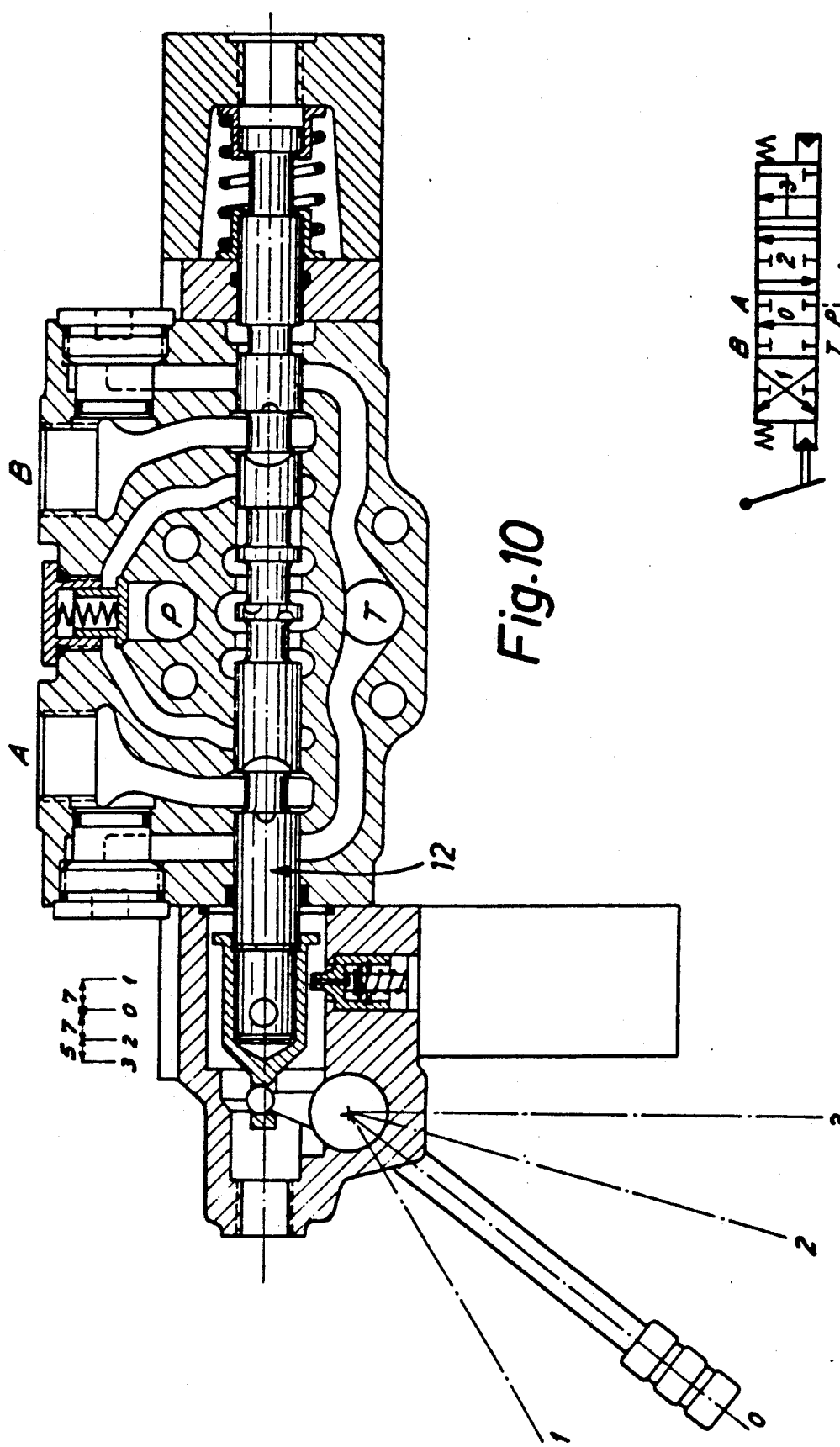
FIG. 10 is a longitudinal section similar to FIG. 1 showing another embodiment of a directional control valve of the invention.
Figure 11:
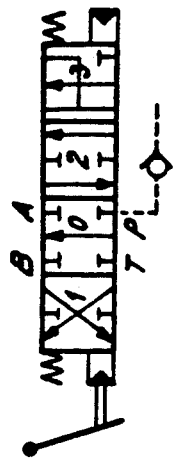
FIG. 11 is the switching symbol of the valve of FIG. 10.

FIGS. 10 and 11 disclose another embodiment of the invention which differs from the embodiment of FIGS. 1 and 2 in so far, as in addition to an hydraulic actuation of the control spool 12 a mechanical actuation is possible from both sides.

FIG. 12 discloses a preferred area of application for the control valve 10 of the invention in connection with additional control valves which supply users with pressure medium. In this area of application a neutral channel 70, as is known per se, and a parallel channel 71, as is known per se, is used. The use of such a neutral channel or a neutral circulation allows that the oil from the pump flows without pressure to the tank T. This has as a consequence, that for a movement of the spool from the zero-position towards the left or, to the right, the oil will be throttled towards the parallel channel 71, which leads to a great degree of sensitivity when actuating such a six-way valve 10.

As mentioned above the pressure medium with which the valve of the invention is particularly useful is oil.

What is claimed:

1. A directional control valve having a plurality of switching positions and comprising:
   a housing,
   a longitudinal bore in said housing,
   a control spool reciprocally mounted in the longitudinal bore of said housing and adapted to be activated to assume any of said switching positions, and
   a locking arrangement for locking said control spool in one of its switching positions said locking arrangement comprising a) a latching means adapted to cooperate with said control spool, said latching means including a solenoid, and a mechanical latching element adapted to be activated by the solenoid, and b) a latch cooperating means in the form of a sleeve fixedly mounted to said control spool, said sleeve comprising an abutment collar, said locking occurring such that switching from said coded position into at least one adjacent switching position is only possible if an signal is applied to the solenoid of said locking arrangement allowing transfer movement of said control spool from the coded position into said adjacent switching position.

2. The directional control valve of claim 1 wherein said control spool is spring centered.

3. The directional control valve of claim 1 wherein said control spool is movable into four switching positions — a first, a second, a third and said coded position — and the transfer movement of the control spool from the coded position into said third position is blocked by said locking arrangement, wherein further the transition from said third position to said coded position is blocked.

4. The directional control valve of claim 3 wherein said latching element comprises a latching bolt, wherein said latching element is further arranged perpendicular with respect to an axis of the control spool and is spring biased towards said sleeve.

5. The directional control valve of claim 4 characterized in that the abutment collar defines two abutment surfaces, one abutment surface facing towards the latching bolt and another abutment surface facing away from said latching bolt, wherein further the latching surface facing towards the abutment collar limits the third switching position, while the abutment surface facing away from the latching bolt limits the fourth switching position after the latching bolt had been removed from a latching position into a release position and then back to said latching position.

6. The directional control valve of claim 5 wherein the abutment surface of the abutment collar facing away from the latching bolt limits by abutment that is in abutment surface at the housing the second switching position.

7. The directional control valve of claim 4 further comprising a cover mounted to the valve housing and a spring biased latching element guided within said cover, said latching element being biased into its latching position by means of said solenoid, and moved into its release position if the solenoid is energized.

8. The directional control valve of claim 7, wherein said solenoid is activated in such a manner that the latching element is held in a raised position until the control spool has reached its fourth switching position.

9. The directional control of claim 1, wherein the abutment collar is located at an activating side of the control spool.

10. A directional control valve comprising:
    a housing,
    a longitudinal bore in said housing,
    a control spool reciprocally mounted in said longitudinal bore, said housing defining two opposite end faces from which opposite ends of said control spool extend,
    a centering spring located at one of said end faces,
    control spool activating means located at said opposite end face,
    a locking sleeve fixedly mounted to said spool and adapted to cooperate with said activating means; and
    a locking means, said locking means forming together with said locking sleeve a locking arrangement adapted to block movement of said spool into at least one predetermined position.

* * * * *